US006640220B1

(12) United States Patent
Firlit et al.

(10) Patent No.: US 6,640,220 B1
(45) Date of Patent: Oct. 28, 2003

(54) SEARCH COPROCESSOR SUBSYSTEM HAVING MULTIPLE SEARCH ENGINES AND DEDICATED KEY-TABLE MEMORY FOR CONNECTION TO A COMPUTER SYSTEM

(75) Inventors: Thaddeus Michael Firlit, Colorado Springs, CO (US); Timothy Allan Melchior, Colorado Springs, CO (US); James Rodney Webster, Manitou Springs, CO (US)

(73) Assignee: Aeroflex UTMC Microelectronic Systems, Inc., Colorado Springs, CO (US)

( * ) Notice: Subject to any disclaimer, the term of this patent is extended or adjusted under 35 U.S.C. 154(b) by 0 days.

(21) Appl. No.: 09/526,069

(22) Filed: Mar. 14, 2000

(51) Int. Cl.[7] .............................................. G06F 17/30
(52) U.S. Cl. .............................................. 707/3; 707/4
(58) Field of Search ................................ 707/1, 104, 3, 707/100, 205, 2, 4, 10, 5, 103; 711/108, 164; 382/284; 370/400, 351, 389, 392, 224; 709/249, 228; 771/5, 208, 216, 221

(56) References Cited

U.S. PATENT DOCUMENTS

| | | | |
|---|---|---|---|
| 4,758,982 A | 7/1988 | Price .......................... 364/900 |
| 4,758,983 A | 7/1988 | Berndt ........................ 365/49 |
| 5,383,146 A | 1/1995 | Threewitt .................... 365/49 |
| 5,423,015 A | 6/1995 | Chung ......................... 395/425 |
| 5,706,224 A | 1/1998 | Srinivasan et al. ........... 365/49 |
| 5,752,260 A | 5/1998 | Liu et al. .................... 711/129 |
| 5,761,714 A | 6/1998 | Liu et al. .................... 711/127 |
| 5,787,458 A | 7/1998 | Miwa .......................... 711/108 |
| 5,796,974 A | 8/1998 | Goddard et al. ............. 395/387 |
| 5,806,083 A | 9/1998 | Edgar ......................... 711/108 |
| 5,893,089 A | 4/1999 | Kikinis ........................ 707/3 |
| 5,909,686 A * | 6/1999 | Muller et al. ................ 370/224 |
| 5,940,852 A | 8/1999 | Rangasayee et al. ........ 711/108 |
| 6,160,419 A | 12/2000 | Veenstra et al. .............. 326/40 |
| 6,226,710 B1 * | 5/2001 | Melchior ...................... 707/3 |
| 6,246,804 B1 * | 6/2001 | Sato et al. .................. 382/284 |

OTHER PUBLICATIONS

"Designing Read And Write Buffers For The R4000 System Interface" by Andrew Ng; 1996 Integrated Device Technology, pp. 123–137.
"Application Note MIPS/PowerPC Boots From DRAM Using GT–64xxx Devices On PCI"; 1999 Galileo Technology, pp. 1–3.

* cited by examiner

Primary Examiner—Dov Popovici
Assistant Examiner—Neveen Abel-Jalil
(74) Attorney, Agent, or Firm—Peter J. Meza; William J. Kubida; Hogan & Hartson LLP (57) ABSTRACT

A search coprocessor card for attachment to a computer system has an interface to a host processor of the computer system and a processor. The processor has memory for its program and data, and is coupled to one or more search engine devices. Each of the search engine devices is in turn coupled to a memory for holding key tables, and is capable of searching the key tables for matching entries.

2 Claims, 5 Drawing Sheets

SEARCH COPROCESSOR SUBSYSTEM HAVING MULTIPLE SEARCH ENGINES AND DEDICATED KEY-TABLE MEMORY FOR CONNECTION TO A COMPUTER SYSTEM

RELATED APPLICATIONS

The present application is related to co-owned U.S. Pat. No. 6,226,710, B1, also filed as PCT patent application PCT/US98/24288, describing the UTCAM search engine utilized in the present invention, the disclosure of which is incorporated herein by reference.

FIELD OF THE INVENTION

The present invention pertains to the field of searching computer databases. In particular, it relates to the design of high-speed search coprocessors for connection to general purpose computing equipment for use in searching computer databases or performing fuzzy logic.

BACKGROUND OF THE INVENTION

Computer databases have become ubiquitous. They range from the relatively small directory databases that keep track of files on desktop computers, to enormous databases like the U.S. Patent Office database of issued patents and the Westlaw and Lexis databases of case law.

Databases must often be searched for information of interest to a particular user, relevant to a particular topic, or needed to conduct a particular transaction. Searching of databases, such as routing tables, is often required of embedded systems, in addition to the more visible database searching performed by conventional computer systems. Searching of databases is known often to require considerable processor time.

Artificial intelligence software, including fuzzy logic and neural network applications as well as pattern-recognition applications such as voice recognition and machine-vision applications, often require matching a pattern to a closest pattern in a database of known patterns. Matching a pattern to a closest pattern in a database is also of use in rule-based language translation applications. Matching a pattern to a closest database pattern requires computation of a distance between the desired pattern and each of multiple database patterns; a process that can consume considerable processor time on conventional systems.

The U.S. Patent Office supports a database of patents that is text searchable for specific words. Similarly, Lexis and Westlaw support massive databases that are text searchable for specific words. Typically, such text-searchable databases allow for a Boolean search, where it may be necessary to search for, and construct a list of, all those database entries having a first matching key. This list may then be combed for occurrences of a second matching key, or merged with another list. It is known that searching such databases requires considerable processor time on conventional computer systems because of the many key comparisons that may be required.

Many databases, including text searchable databases and computer filesystem directory databases, are searchable with search strings. These searches require finding all matching records of a database, a task that often requires numerous comparisons and considerable processor time on conventional computer systems.

It is known that Internet IP addresses have a sequence of, typically four, bytes. The first byte of the sequence represents a network number, the last byte of the sequence represents an individual machine number on a subnetwork or sub-subnetwork, the intermediate bytes represents a sub-network and sub-subnetwork. Each service provider or network forming part of the internet is assigned a network, subnetwork, or sub-subnetwork identification. While it may be possible for any given router to route some packets according to their network number, others may require routing according to both their network number and subnetwork number. Still others may require routing according to more bits, perhaps including their sub-subnetwork and machine numbers, while packets that match network and subnetwork but mismatch sub-subnetwork and machine being routed according to a different, default, route table entry.

A Longest Prefix Match search is a search for the key having the most significant bits—where significant bits are determined by a code attached to the key—that match a key being searched for. A longest prefix match search is useful in Internet packet routing; and will be of use with IPV-4 or future Internet routing protocols where the byte boundary distinction is blurred and additional bytes may be provided.

Recognizing that there is a need for high-speed searching of computer databases, UTMC Microelectronics Systems Inc., a subsidiary of Aeroflex, Incorporated, has marketed a UTCAM-Engine device. This device provides hardware high-speed search capability for large key tables in an attached static RAM, versions of this device have been in production since October 1998; a more recent, enhanced, version supporting larger, multiple, key tables located in attached PC-100 SDRAM (SDRAM means Synchronous Dynamic Random Access Memory) and Longest Prefix Match searches, was first produced in June of 1999.

Each key table entry in the memory attached to a UTCAM-Engine may have an association attached to it, the association often being a pointer or other reference to data in a database. When the UTCAM-Engine device finds a requested key, the association may then be followed to locate desired data. A detailed discussion of this device can be found on the UTMC website, at www.utmc.com.

The UTCAM-Engine is a pipelined, high-speed, device capable of rapidly searching for the matching key of up to thirty-two bytes in a hash-coded table, searching a table for the closest match of a pattern to a key-table pattern using either sum-of-the-squares or straight-sum distance computations, or of searching for a longest prefix match. The UTCAM engine can perform these searches at a rate of up to over fifty million comparisons per second. Some additional detail on the UTCAM-Engine is available in U.S. Pat. No. 6,226,710, also filed as PCT patent application PCT/US98/24288, more information is posted on the UTMC Microelectronics website at www.utmc.com.

The UTCAM-Engine can not, by itself, perform logical operations on lists of matching keys, nor can it extract a sequence of multiple matching keys to form a list of matching key/reference pairs. Both these operations are of frequent interest in database operations.

It is known that the PCI bus specification imposes a power limit of 25 watts per PCI card. This limit is intended to ensure that the bus edge connector pins, motherboard interconnect, wiring between motherboard and power supply, and typical system power supplies are not overloaded as well as limiting the heat that must be removed by the often inadequate fans provided in typical systems. Overloading of power supplies, motherboard interconnect, and wiring between motherboard and power supply is known to have potential to cause improper operating voltages within a computer system, thereby causing faulty operation.

SUMMARY OF THE INVENTION

A search coprocessor for connection to general purpose computing equipment has a programmable processor, a program and data memory, multiple dedicated search engines each having a key-table memory, and a port for communicating over a PCI bus with a host computer. Central to the coprocessor is a buffered command interchange device that interconnects the search engines with the programmable processor.

Each of the dedicated search engines has its own key-table memory, wherein is stored key or index information and association information for locating information in one or more databases. It is expected that key or index information will be distributed between the multiple key-table memories of the coprocessor.

The programmable processor, a MIPS RISC processor, of each coprocessor is capable of parsing search commands into atomic searches performed on the search engines, and for combining results of these atomic searches into overall search results for the search commands. In this way, the search coprocessor can perform logical operations on intermediate search result lists, including AND and OR operations.

Each coprocessor has an auxiliary power connector and voltage regulator module so as to avoid exceeding the PCI limit of 25 watts drawn through a motherboard connector. Provisions are made for as many as four of coprocessors to coexist in a computer system; it is expected that future models will provide for a greater maximum number of coprocessors per system.

DESCRIPTION OF A PREFERRED EMBODIMENT

A computing system for searching databases has a CPU 100 (FIG. 1) with first and second level cache 101 as is common in the art. While the preferred embodiment utilizes an Intel Pentium III, other processors including Ultrasparc, Sparc, Alpha, MIPS, and Power-PC may be used. Second-level cache 101 misses, I/O operations, and references to noncacheable storage are transmitted to a standard motherboard chipset 102, as is known in the art. Motherboard chipset 102 communicates references addressed to memory to a memory 103, and those addressed to peripherals to a high-performance PCI bus 104, as is known in the art.

Figure 1:
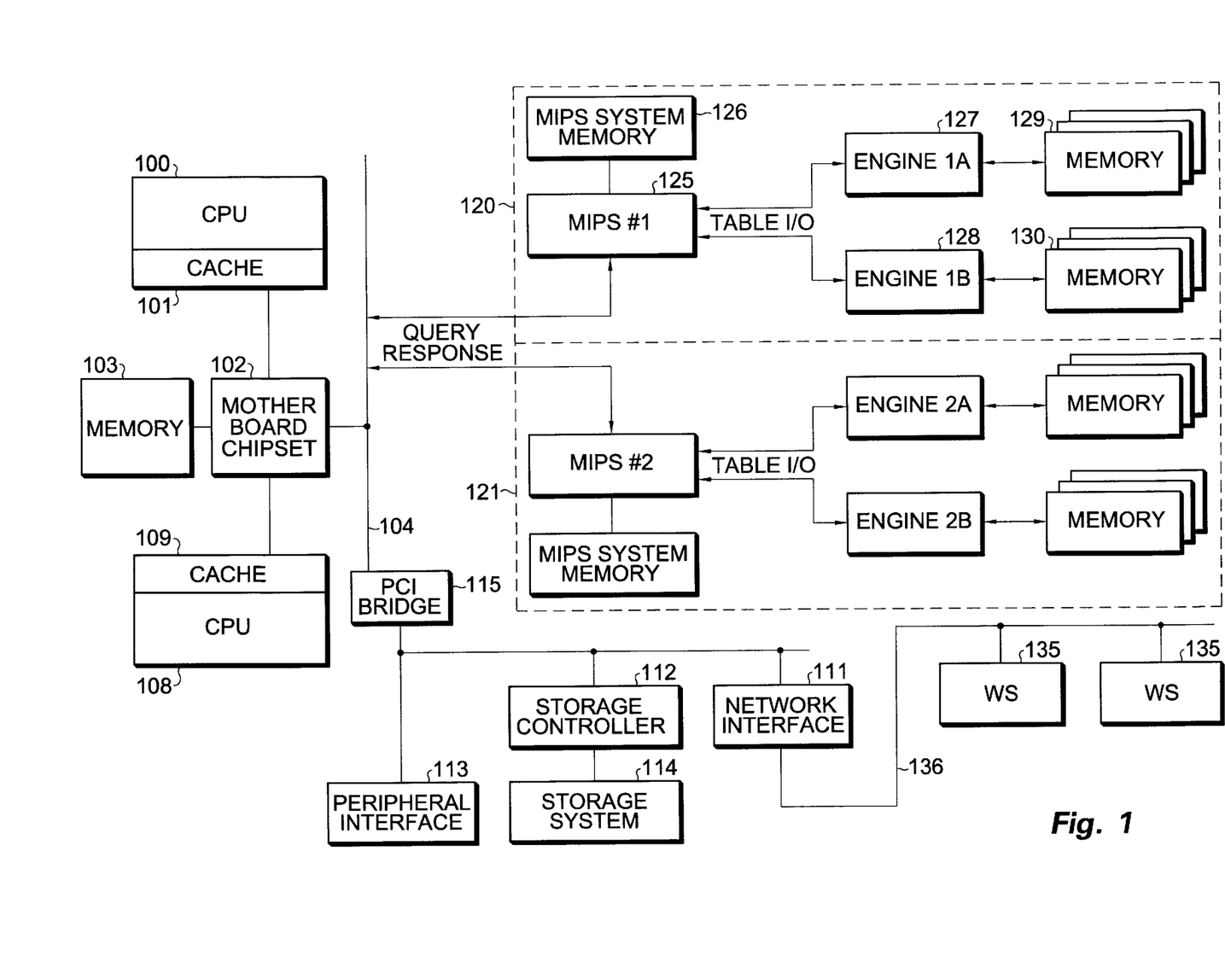
FIG. 1 is a block diagram of a computer system having a pair of search coprocessors of the present invention.

The computing system may have one or more additional sets of processors 108 and cache memory 109 as illustrated. The PCI bus 104 communicates with a network interface 111, a storage controller 112, and other peripherals such as keyboard, mouse, and video interface 113. Storage controller 112, preferably of the ultra-wide SCSI type, communicates with a storage system 114, which may incorporate one or more disk drives or RAID systems as is known in the art of storage systems. The PCI bus may incorporate one or more PCI bus bridge devices 115 so as to avoid excessive loading, and may therefore be comprised of several PCI bus segments. Attached to the PCI bus is at least one search coprocessor 120, there may be from one to three additional search coprocessors 121 in the computing system. The database to be queried is stored on the storage system 114, as is an operating system and a database query handling program.

Each search coprocessor 120 has a 250-MHz MIPS RISC processor block 125 with program and data RAM 126 for use by the RISC processor block 125. Program and data RAM 126 is preferably an SDRAM SODIMM as is known in the art of computing systems. RISC processor block 125 also communicates with a pair of search engine devices, 127 and 128, each search engine device has an associated key table memory, 129 and 130. Search engine: devices 127 and 128 are preferably the enhanced UTCAM-Engine devices described above. Key table memories 129 and 130 are preferably industry standard PC-100 SDRAM 168-pin DIMM devices.

Upon initialization of the database query handling program, a search firmware program is loaded into the program and data memory 126 of the coprocessor, and key tables for the database are then copied from the storage system 114, translated into a format suitable for use with the search engine devices 127 and 128, and copied under control of a CPU 100 or 108 in cooperation with the RISC processor block 125 into one or both storage table memories 129 and 130. These key tables may be, and preferably are, distributed amongst the search coprocessors 120 and 121 of the system if there are more than one search coprocessors in the system.

Database access operations normally originate at one or more workstations 135 and are transmitted over a high-speed network 136 to the network interface 111. The high-speed network 136 may incorporate the Internet, and may incorporate routers, hubs, switches, modems, and other devices known in the networking art. Those database operations requiring query operations are processed by at least one of the CPUs 100 and 108 into a suitable query form for transmission to the RISC processor block 125 of the search coprocessors 120 and 121. Queries are thereupon passed from the RISC processor block 125 to one or both of the search engines 127 and 128 attached thereto, which search the key tables in the storage table memories 129 and 130. Information as to keys found, or not found, in the storage table memories 129 and 130 is then passed from the search engines 127 and 128 to the RISC processor block 125, where it is formatted as responses to the queries, then these responses are provided to one of the CPUs 100 and 108 for formatting into a response, with such additional data as may be appropriate.

Figure 2:
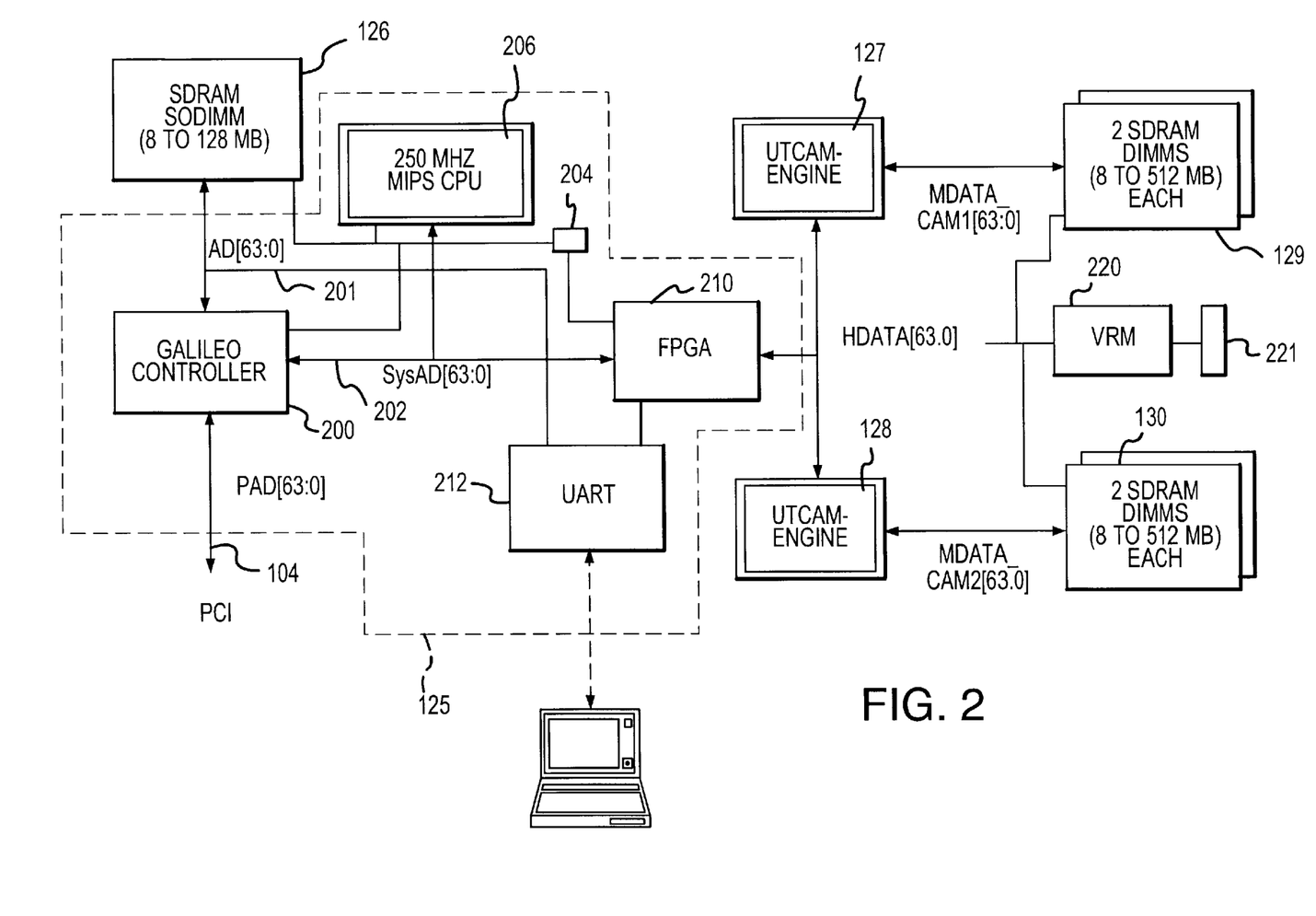
FIG. 2, a block diagram of a search coprocessor of the present invention.

The RISC processor block 125 can be seen in greater detail FIG. 2. The PCI Bus 104 is coupled to a Galileo GT64120A multifunction bus bridge chip 200, which has PCI bus-mastering capabilities, a DRAM controller, and a DMA controller. This bus bridge 200 interfaces the PCI bus to a pair of address-data multiplexed busses 201 and 202, both operating at an coprocessor clock 204 frequency of one hundred MHz. The PCI bus operates at a selectable thirty-three or sixty-six MHz and is of selectable thirty-two or sixty-four bit width. This bus bridge 200 is designed to handle the asynchronous nature of the PCI bus and internal clocks while mapping the program and data RAM 126 into the address space of the PCI Bus for communication with a host processor 100 and 108 and performing power-supply isolation.

The first 201 of the address-data multiplexed busses connects the program and data RAM 126 to the bus bridge 200, and the second 202 of the address-data multiplexed busses connects the RISC processor 206 to the bus bridge 200 and to an FPGA 210. FPGA 210 serves as an address decoder and double-write-buffered bridge interconnecting the second 202 address-data multiplexed bus with the search engines 127 and 128. A UART device 212 connects to the first bus 201. FPGA 210 is an Actel FPGA, although it is believed that other commercially available properly-configured available FPGA devices, or a custom ASIC, may serve.

UART device 212 serves to connect an external terminal 215 or debug station to the RISC processor 206 such that debug access to any code running on the RISC processor may be attained.

In the preferred embodiment, the MIPS processor 206 operates at a processor clock frequency of two hundred fifty MHz, using an internal clock-multiplication PLL. The search engines 127 and 128, and the table memories 129 and 130, operate at one hundred MHz; while the PCI Bus 104 operates at a jumper-selectable thirty-three or sixty-six MHz and is selectable for a thirty-two or a sixty-four bit data path, as is known in the art of PCI busses.

In the preferred embodiment, the table memories 129 and 130 of each coprocessor have one or two DIMMS of from eight to five hundred twelve megabytes each, for up to a gigabyte per table memory, with a capacity of up to two gigabytes per coprocessor. Table memory size provided in a given system is dependant upon the needs of a particular application. It is expected that larger memories may be provided in future implementations of the present invention; the UTCAM search engine presently supports addressing of up to thirty-two gigabytes of table memory.

Upon system boot, a task running on a host CPU 100 and 108 polls for 240 (FIG. 2A) and finds each PCI device, as is known in the art of PCI busses. Each PCI device responds to a configuration mode read with an identification code, as per the PCI specification, including memory space requirements; a host CPU 100 or 108 then allocates 241 PCI memory and interrupts to the coprocessor. That CPU then configures 242 the bus bridge 200 with addresses in the PCI address space for its use in run-time mode, including addresses where at least one window of up to 16 megabytes of space in the coprocessor's code/data memory 126 is mapped into the PCI address space.

Figure 2A:
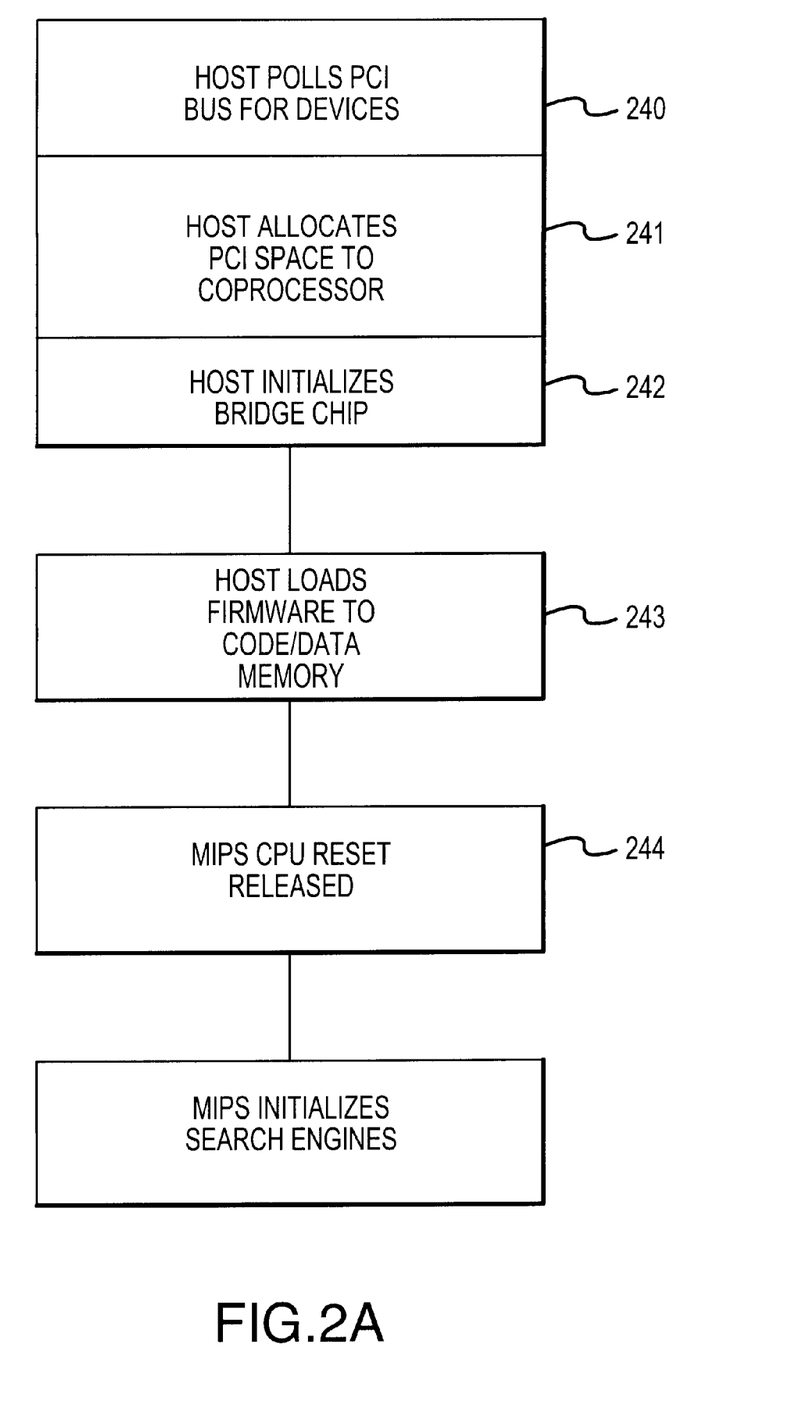
FIG. 2A, a flowchart of the initialization sequence of the coprocessor.

This window is sufficient for a host CPU 100 or 108 to load 243, upon initialization of a database program on the host CPU, the search firmware of the preferred embodiment into the code/data memory 126; in an alternative embodiment a bootstrap firmware utility is loaded into this window to permit copying a larger search firmware into the code/data memory 126 in sections. Once firmware is loaded, its execution may be initiated through a release 244 of a reset line of the RISC processor 206. Once the RISC processor 206 begins execution, it initializes 245 the search engines 127 and 128, and cooperates with a host CPU 100 or 108 the table memories 129 and 130.

It is expected that a heavily loaded coprocessor equipped with a maximum of program and data memory and a maximum of table memory, may dissipate over twice the twenty-five watt PCI card limit. Each coprocessor is therefore fitted with a voltage regulator module 220 (FIG. 2) having a drive power connector 221 as commonly found on disk drives of small computer systems. This voltage regulator module 220 is preferably coupled to provide power to the components of the coprocessor except for the bus-driver devices of the bridge chip 200, which is powered from the PCI Bus.

In order to ensure adequate cooling, multiple coprocessors in a system are preferably operated with auxiliary fans in addition to those ordinarily present in a system cabinet. It is preferred that these take the form of a plug in card, such as a PCI bus card available from PC Power & Cooling, Inc. of Carlsbad, Calif.

The FPGA 210 is coupled to sixty-four bit address/data bus 202, and implements a double-buffered write from this bus 202 in write buffers 250 and 251 (FIG. 2B) for write operations from the RISC processor 206 to the search engines 127 and 128. It also includes reset logic 255 and initialization logic 256 for initializing the RISC processor 206. It also incorporates address decode 260 and control and status interface logic 262 for reading status information to the RISC processor 206 from the search engines 127 and 128. Control and status interface logic 262 also permits reading of a two-bit jumper available on the coprocessor. This jumper may be used to identify coprocessor cards, or the table memory configuration of the coprocessor cards, to a host CPU 100 or 108, since no provision is made for the RISC processor 206 to read the identification EEPROMs commonly found on PC-100 compatible memory such as is used for table memories 129 and 130.

Figure 2B:
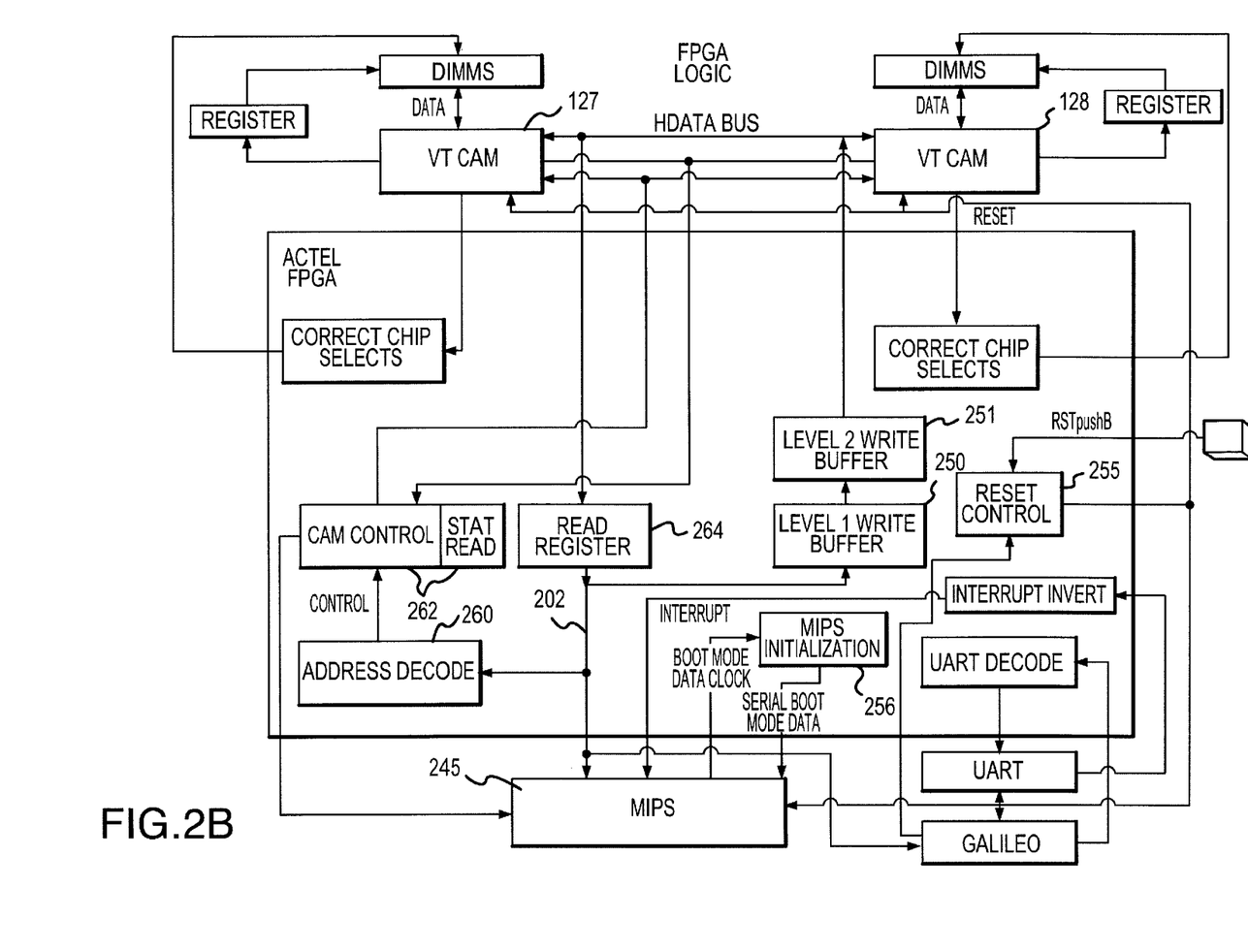
FIG. 2B, a block diagram of the glue logic implemented in the FPGA of the coprocessor.

The RISC processor 206 is a Quantum Effect Devices QED RM5261 MIPS-family processor. This is pipelined such that it may perform a second write to the search coprocessor 127 or 128 at or after that search coprocessor's internal write FIFO becomes full. Use of multiple write buffers, such as write buffers 250 and 251, permit that second write from the RISC processor 206 without loss of data.

Data returned by the search engines is read through a read register 264 of sixty-four bit width and imposing a one clock delay.

Figure 3:
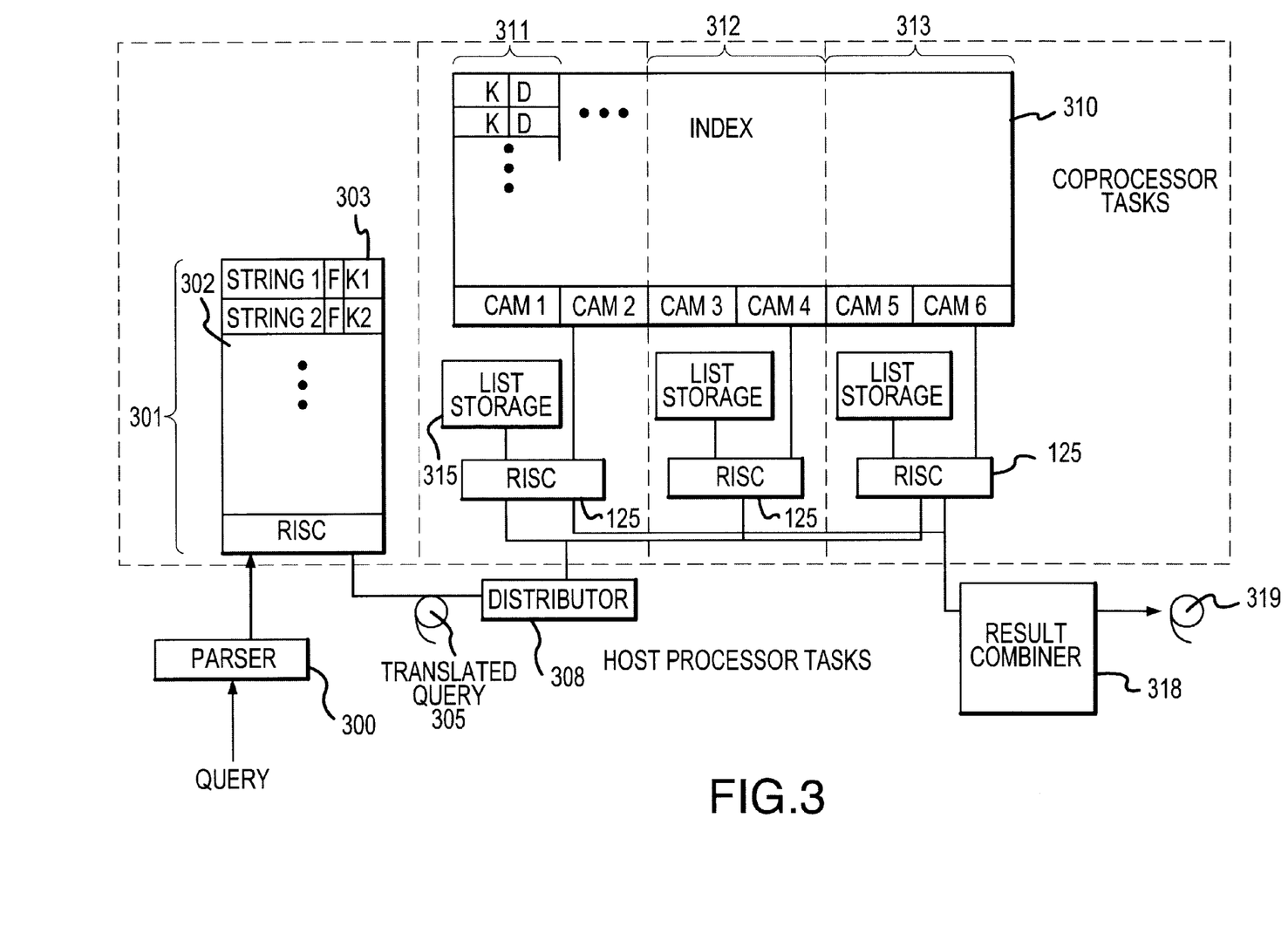
FIG. 3, a diagram of a database search system showing how lookup tasks may be distributed among multiple search coprocessors.

In a document-based search system, a Boolean text-search query may be parsed by a parser 300, operating on one of the host processors 100 and 108 (FIG. 1) into a sequence of searches for words and logical operations. A first coprocessor 301 of the present invention has a dictionary table 302, distributed between the RAM 129 and 130 associated with the two search engines 127 and 128 of the first coprocessor 301, of searchable words for the search system. Each word, of up to thirty-two characters each, in each sequence is looked up by the first coprocessor 301 in the dictionary table 302 to find search keys 303. The search keys 303 found for all searchable words of the dictionary that matched the wildcard parameters of each word of the sequence are combined into a sequence of key lists to be searched and logical operations thereon that forms a translated query 305, perhaps of the form (C or D or E) AND (F or G or H), each key list having at least one key to be searched.

The translated query is distributed by a distribution module 308 among three additional coprocessors 311, 312, and 313, each of which has one third of an index 310, partitioned by document number, and organized as a hash table for search by key, of records comprising a key and a document number. The RISC processor block 125 of each coprocessor thereupon commands its associated search engines 127 and 128 to search each key of each key list to be searched, in its table memory 129 and 130, collecting the document numbers of all documents found into sorted hit lists in a list storage 315, the list storage physically located in each coprocessor's program and data RAM 126. The hit lists for each searched key list may then be subjected to logical operations, such as AND or OR operations, performed by the RISC processor block 125 and operating in its local program and data RAM 126. Search commands for each search coprocessor, for interpretation by the RISC processor block 125, may therefore be at a much higher level than are search commands to the search engines 127 and 128.

Once each coprocessor of coprocessors 311, 312, and 313 has performed the operations indicated by the translated query 305, to form a logical result hit list, the logical result hit list from each of coprocessors 311, 312, and 313 is transferred to host memory 103 and combined by concatenation in a combiner module 318 to form a combined hit list 319 of all documents that satisfy the translated query 305.

A document search system according to FIG. 3, having four coprocessors, may support a dictionary of up to 100,000,000 searchable words and 400,000,000 key / document number records while searching tens of thousands of queries per second. The document search system may be scaled to much larger database sizes while retaining high throughput by providing additional search coprocessors and by caching the key / document number records such that only key / document number records associated with recently searched keys, and thereby with recently searched searchable words, are actively maintained in table memory 129 and 130 of the coprocessors 311, 312, and 313.

On systems incorporating such caching, data removal commands are issued by a host processor 100 or 108 for execution by the RISC coprocessor block 125. Similarly, data for insertion into tables is transferred from the storage system 114 to the RISC coprocessor blocks 125 under command of a host processor 100 or 108.

A distributed database search application having an SQL or equivalent query language can be constructed as discussed for this document search application.

In a brute-force video pattern-matching system incorporating a search coprocessor of the present invention, the host CPU's 100 and 108 reduce a full-color image to a gray-scale image, which is then loaded into the coprocessor code/data memory 126. This image is copied through search engines 127 and 128 by the MIPS processor 125 into proximity tables in table memory 129 and 130. This copy to table memory may occur while the host CPU's 100 and 108 are converting a following image to gray-scale. These proximity tables are preferably formed as thirty-two byte search keys corresponding to multiple, overlapping, windows of pixels from the gray-scale image. These windows may be copied at several magnification levels.

MIPS processor 125 thereupon commands the search engines to perform a sequence of proximity matches, each seeking the best match of a sequence of search keys corresponding to an object to be sought in the image. The search keys corresponding object to be sought may correspond to letters or numbers for optical text processing, or may correspond to various rotations and magnifications of an image of a target such as a tank or a truck. Once candidate images are located in the table memory, addresses corresponding thereto, and the identity of the best-match library key, are returned to the host CPU's 100 or 108 for further processing.

An alternative embodiment that parses an image into search commands, searching these for matches against library images and image segments in table memory, is also expected to work, although performance would differ.

A wide variety of other applications for the coprocessor of the present invention are possible. For example, a coprocessor of the present invention may provide longest-prefix search capacity to an internet router or a telephone switch.

A search coprocessor of the present invention may also be useful for fast mapping of virtual telephone numbers into physical telephone numbers. This would allow telephone customers to maintain constant telephone numbers despite changes in service providers or locations within the physical telephone network.

Similarly, a coprocessor of the present invention may also be used for compressing data, including compressing video data, since compression often involves determining repeated segments of data within a frame or from frame to frame.

The bridge chip 200 has bus-mastering and block transfer capabilities. In an alternative embodiment, these capabilities are used by the RISC processor 206 to follow a linked list of search commands, each search command detailing a search to be performed, the list having been constructed by a host CPU 100 or 108 in memory 103. Each search command from the list is fetched by the bridge chip 200 under command of the RISC processor 206 to code/data memory 126, whence it is parsed and executed, with results returned to memory 103. A link of the linked list of search commands is then followed to the next search command, which is executed in like manner.

While there have been described above the principles of the present invention in conjunction with specific embodiments thereof, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A method of searching, the method comprising the steps of:

generating a high-level search request in a first processor;

determining a coprocessor for handling a distributed search request from a plurality of coprocessors, and transferring the distributed search request to the determined coprocessor using an interface that couples the first processor to the plurality of coprocessors;

receiving the distributed search request on a general purpose processor located on one of the plurality of coprocessors and parsing the distributed search request into at least one atomic search command;

determining at least one search engine device, located on the determined coprocessor and containing at least one table memory, to perform the atomic search command; wherein the at least one search engine device is capable of searching a key table located in the at least one table memory coupled to the at least one search engine for any matching entries of the key table;

submitting the at least one atomic search command from the general purpose processor located on one of the plurality of coprocessors to the at least one search engine device located on the coprocessor, and receiving at the general Purpose processor at least one atomic search result from the search engine device;

combining, on the general purpose processor located on one of the plurality of coprocessors, at least one atomic search result from the at least one search engine device into a composite result for the distributed search request;

returning the composite result for the distributed search request to the first processor; and collecting, in the first processor, one or more distributed search results from one or more coprocessors to produce the final desired high-level search result.

2. The method of claim 1, wherein the atomic search command includes searches for a closest match to a group of pixels of an image.

* * * * *

UNITED STATES PATENT AND TRADEMARK OFFICE
CERTIFICATE OF CORRECTION

PATENT NO. : 6,640,220 B1
DATED : October 28, 2003
INVENTOR(S) : Thaddeus Michael Firlit, Timothy Allan Melchior and James Rodney Webster It is certified that error appears in the above-identified patent and that said Letters Patent is hereby corrected as shown below:

<u>Column 10,</u>
Line 18, "Purpose" should be -- purpose --

Signed and Sealed this

Twenty-third Day of March, 2004

JON W. DUDAS
*Acting Director of the United States Patent and Trademark Office*